United States Patent
Toman

Patent Number: 5,713,189
Date of Patent: Feb. 3, 1998

[54] INTERACTIVE BRAKE SYSTEM FOR ELECTRIC RIDING MOWER

[75] Inventor: Charles Richard Toman, Lincoln, Nebr.

[73] Assignee: Ransomes America Corporation, Lincoln, Nebr.

[21] Appl. No.: 515,809

[22] Filed: Aug. 16, 1995

[51] Int. Cl.$^6$ .................................................. B60K 26/00
[52] U.S. Cl. ............................ 56/7; 56/11.3; 56/11.9; 56/14.7; 56/16.7; 180/170; 180/272
[58] Field of Search ................... 56/7, 11.9, 10.8, 56/11.3, 16.7, 14.7, 10.2 G, 10.2 H; 180/170, 271, 272, 282

[56] References Cited

U.S. PATENT DOCUMENTS

| | | | |
|---|---|---|---|
| 2,164,114 | 6/1939 | Kolb | 180/282 X |
| 2,192,021 | 2/1940 | Weeks | 180/272 |
| 2,395,904 | 3/1946 | Oetzel | 180/282 X |
| 3,141,707 | 7/1964 | Nigh | 180/282 X |
| 3,186,508 | 6/1965 | Lamont | 180/272 |
| 3,206,116 | 9/1965 | Short | 180/282 X |
| 3,513,925 | 5/1970 | Figura | 56/11.3 X |
| 3,559,206 | 1/1971 | Beecham | 180/272 |
| 3,572,455 | 3/1971 | Brueske . | |
| 3,645,241 | 2/1972 | Huntzinger . | |
| 3,716,116 | 2/1973 | Von Seggern . | |
| 3,773,156 | 11/1973 | Nyquist | 56/11.3 X |
| 3,775,973 | 12/1973 | Hudson . | |
| 3,810,520 | 5/1974 | Iwata et al. | 180/282 |
| 3,942,604 | 3/1976 | Black, III | 180/272 |
| 3,958,398 | 5/1976 | Fuelling, Jr. et al. . | |
| 3,960,233 | 6/1976 | Aldred . | |
| 4,093,896 | 6/1978 | McAuliffe . | |
| 4,131,832 | 12/1978 | Cavil et al. . | |
| 4,175,632 | 11/1979 | Lassanske . | |
| 4,260,937 | 4/1981 | Cavil et al. . | |
| 4,306,404 | 12/1981 | Szymanis et al. . | |
| 4,386,674 | 6/1983 | Sugata | 180/282 X |
| 4,476,964 | 10/1984 | Broman . | |
| 4,543,850 | 10/1985 | Bednar et al. . | |
| 4,572,310 | 2/1986 | Peter . | |
| 4,675,585 | 6/1987 | Krueger et al. . | |
| 4,694,942 | 9/1987 | Ogano et al. | 56/11.3 X |
| 4,704,541 | 11/1987 | Leiber | 180/282 |
| 4,771,849 | 9/1988 | Leiber et al. | 180/282 X |
| 4,867,289 | 9/1989 | Wooters . | |
| 4,920,733 | 5/1990 | Berrios . | |
| 5,197,008 | 3/1993 | Itoh et al. | 180/282 X |
| 5,199,525 | 4/1993 | Schueler . | |
| 5,203,147 | 4/1993 | Long . | |
| 5,343,678 | 9/1994 | Stuart | 56/11.3 |
| 5,357,435 | 10/1994 | Yasuda | 180/282 X |
| 5,406,778 | 4/1995 | Lamb et al. | 56/7 |
| 5,415,059 | 5/1995 | Hein et al. | 56/11.3 X |

FOREIGN PATENT DOCUMENTS

| | | | |
|---|---|---|---|
| 745417 | 7/1980 | U.S.S.R. | 56/10.2 G |
| 2107489 | 4/1983 | United Kingdom | 56/10.2 G |

*Primary Examiner*—Randolph A. Reese
*Assistant Examiner*—Christopher J. Novosad
*Attorney, Agent, or Firm*—Harness, Dickey & Pierce, P.L.C.

[57] ABSTRACT

An interactive braking system for an electric mower is comprised of an directional control that is connected to a cam follower that, in turn, engages a brake lever. A linkage system connects the brake lever to a brake caliper assembly which is operable to engage a disc connected to an input shaft of a transaxle of a riding mower. The interactive braking system is designed to allow the operator to optimize control of the mower during slow speed operation, for example, when traversing the crown of a green or going down a hill. During these conditions, the directional control can be articulated to a slow speed position thus proportionally engaging the brake assembly. Increased braking force is realized the closer the directional control approaches the neutral position, i.e., zero throttle. The interactive braking system provides for enhanced control of the mower during slow speed operation of both forward and rearward movement of the mower. An electronic throttle control system is connected to the directional control and produces a signal proportional to the direction and speed desired by the operator. Alternative embodiments of the interactive braking system include using drum brakes, hydraulically actuated brakes or electronically controlled brakes either alone or in combination with a mechanical brake.

7 Claims, 9 Drawing Sheets

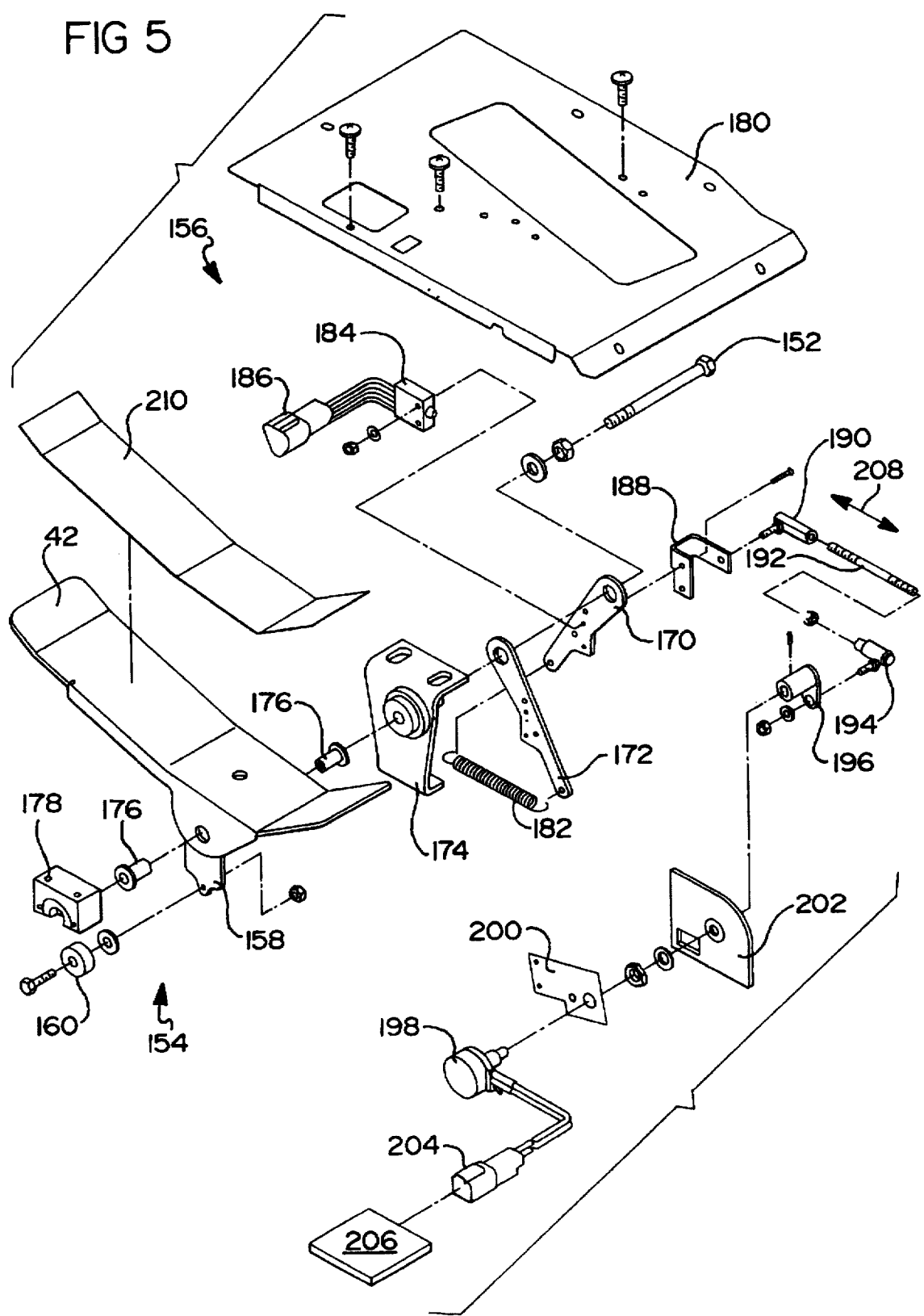

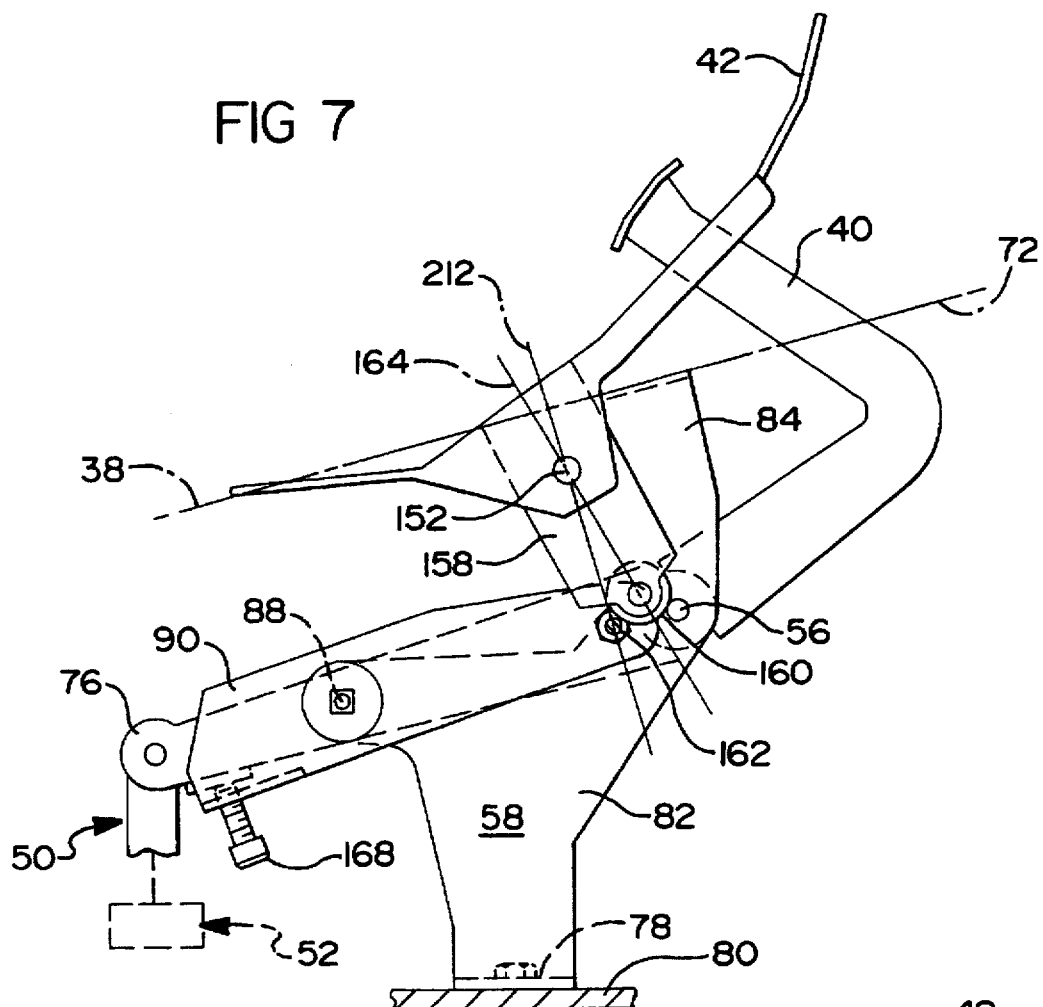

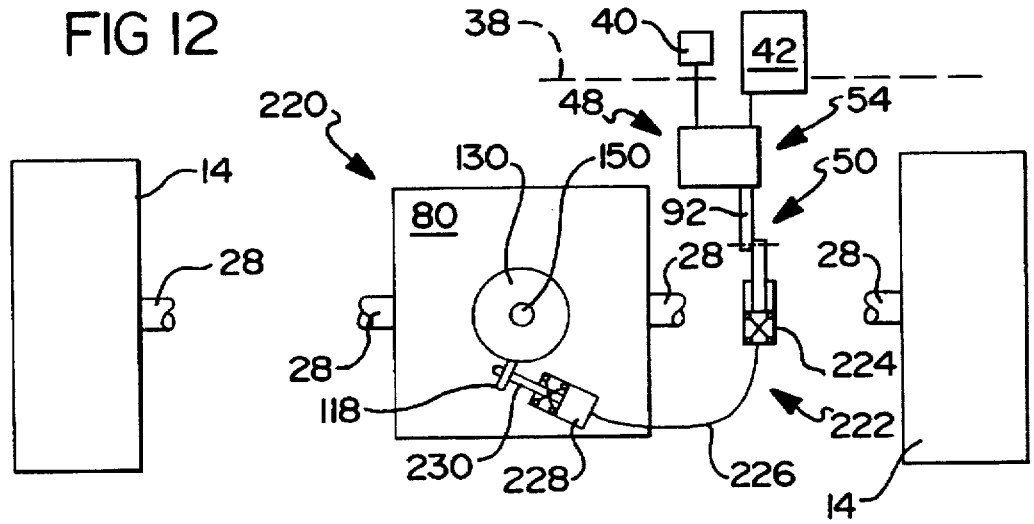
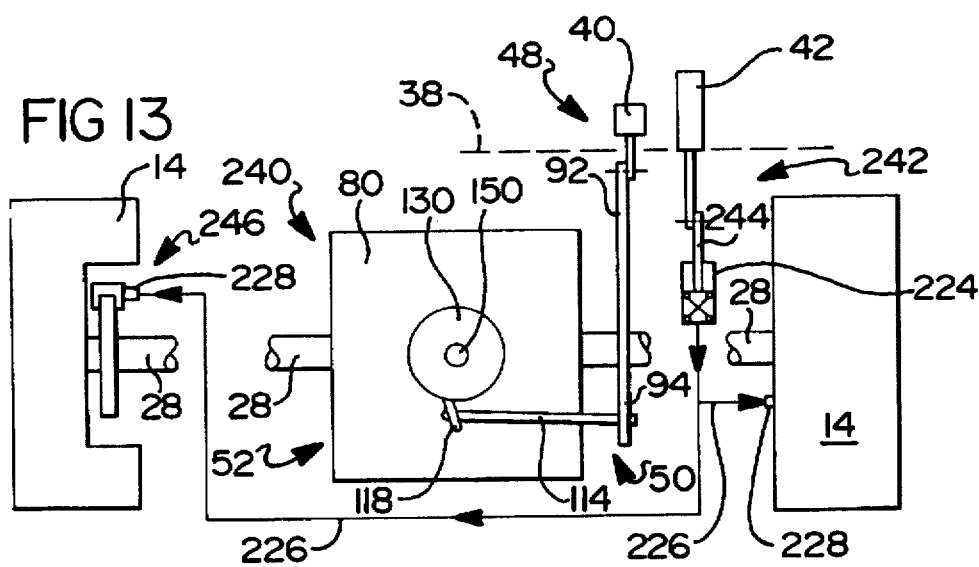
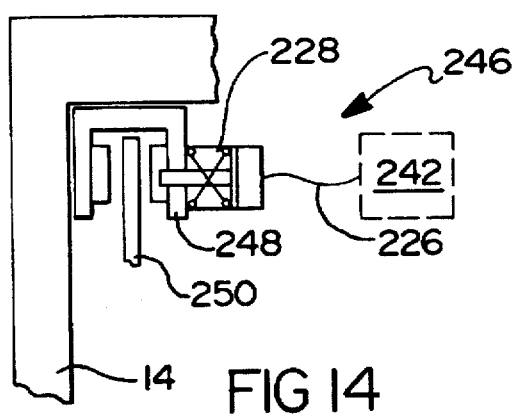
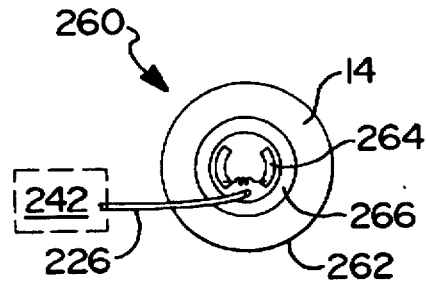

INTERACTIVE BRAKE SYSTEM FOR ELECTRIC RIDING MOWER

BACKGROUND OF THE INVENTION

1. Field of the Invention

The present invention generally relates to turf care equipment, and more particularly, to an interactive braking system for a riding greens mower.

2. Discussion

A wide variety of lawn mowers are available including powered or non-powered, gas or electrical, riding, walk behind, multiple or gang, reel or rotary, just to name a few. Many of these mowers are appropriate for residential jobs however the electrical powered mower has drawn particular interest in the field of golf-course management. Golf courses often have rugged terrain not only in the rough, but also in areas directly approaching the golf course green. Mowing of golf course greens requires a very precise mower that is capable of providing consistent close cropped cut of the green turf. This often requires the lawn mower operator to mow right up to the outer edge of the green, retract the mowers, drive off of the green onto a crown or rough area and quickly turn around and reenter onto the green in nearly the exact place where the operator exited. This causes problems for the lawn mower operator because of the often steep decline the lawn mower must go down in order to turn around and traverse back up to the greens area.

With prior gas operated or even electric powered greens machines, the operator would take his foot off of the directional control pedal which would cause the lawn mower to coast. In order to provide braking action, the operator would have to engage a conventional mechanical or hydraulic brake that is activated by depressing a separate brake pedal. This requires prompt operator interaction in order to maintain control of the mower. If the lawn mower, however, was an electric lawn mower, then the operator could toggle the directional control pedal backwards in order to reverse the electric motor which would cause a "plugging action." While this would slow down the mower, it would indirectly increase the operating temperature of the electric motor as well as utilize precious energy. When operating the mower on hot days increasing the electric motor's temperature could be a disadvantage.

It would be beneficial to have an interactive braking system that allows the operator to have complete confidence and control when mowing on the fringe of a downwardly sloping green and even on the downwardly sloping hill that is usually adjacent to the green. By providing such a feature the operator would have less tendency to overrun the green in order to turn around in a flatter spot. As a result, the energy used may be actually less than any other electric mowers not equipped with this feature. It would also be advantageous to provide the operator with a fine sense of speed control without having to mentally think about applying a separate brake pedal. It would also be desirable to have a greens mower that would automatically engage a brake in a proportional manner based upon the positioning of the directional control pedal. And finally, it would be advantageous to provide a unique directional control assembly that interacts with a brake to control the speed of the mower.

SUMMARY OF THE INVENTION

The present invention provides an all electric drive riding greens mower that offers enhanced operator control during low speed operations, especially when an operator is going downhill off of a sloping green. This is accomplished by providing an interactive braking system for an electric mower which gives the operator additional fine speed control strictly by controlling the angle of the directional control pedal which is operable to engage a brake.

The interactive brake for an electric mower includes a frame supported upon a plurality of ground engaging wheels and upon which are supported a battery power source, an operator station, a plurality of reel lawn mowers, and an interactive braking system. The interactive braking system is comprised of a directional control pedal assembly, a brake pedal assembly, a linkage assembly and a brake caliper assembly. The brake pedal assembly is operable to engage the linkage assembly which, in turn, engages the brake caliper assembly. The brake caliper assembly essentially incorporates a set of brake pads that are operable to engage a disc which is fixed to an input shaft of a differential. Because of the relatively high ratio of gearing between the drive wheels (tires) which are on the output of the differential, and the brake on the input of the differential, the total amount of force required to apply the disc brake on the differential input is very low. This design enhances the interactive braking systems capability of working so easily and explains why the operator does not need to apply a great deal of force in order to sufficiently activate the linkage assembly to cause the brake pads to react against the disc.

An important feature here is how the directional control assembly is linked to the brake pedal assembly which, in turn, allows the directional control pedal to indirectly engage the linkage assembly and the brake. The accelerator assembly includes a directional control pedal that has a roller rotatably connected to the underside of the pedal for engaging one end of an articulating cam follower. The other end of the cam follower is designed to engage the brake pedal thus causing the linkage assembly to activate the brake. The roller only engages the articulating cam follower under certain predetermined conditions, for example, when the speed of the lawn mower approaches approximately three miles per hour. This is below normal lawn mower greens cutting speeds. Moreover, the roller and the articulating cam follower are designed such that the lower the speed of the mower, the greater the braking force applied by the brake. Thus, a proportional interactive braking system is provided for giving the operator enhanced control during critical slow-speed operation, for example when going downhill or when traversing a sloping green. This proportional design works both when the directional control pedal is advanced to a forward position or even when the directional control pedal is in a reversing direction. Thus, the operator is benefited by this proportional interactive braking system for both forward and rearward operations.

An additional important feature and object of the present invention is the unique directional control components of the accelerator assembly. Specifically, the directional control pedal is connected to a foot actuated potentiometer system that divides the input voltage depending upon the position of the drive pedal. The variable output voltage signal produced by the potentiometer is delivered to a motor controller which, in turn, responds by modulating the current flowing through the motor that drives the mower.

Another object of the present invention is to provide an alternative braking system that interacts with the brake pedal and the directional control pedal. For example, the brake pedal and directional control pedal can be connected to a hydraulic circuit which in turn activates the disk brake assembly. Also, the conventional mechanical parking brake system can be connected to the disk brake on the input side of the transaxle while a separate hydraulic circuit can be connected to the directional control pedal. Thus, a combination mechanical and hydraulic set up can be used. Further, another alternative embodiment to the present invention includes the employment of connecting either the hydraulic, mechanical or combination thereof, braking system to drum brakes that are connected to the drive wheels. Another object of the present invention is to provide an interactive braking system that utilizes electric braking wherein the directional control pedal is connected to a pot which sends a signal to the input side of an electronic control unit. The electronic control unit produces an output signal to an amplifier which in turn activates a proportional electric braking arrangement that is connected to the drive wheels of the mower.

These and other advantages and features of the present invention will become readily apparent from the following detailed description, claims and drawings.

BRIEF DESCRIPTION OF THE DRAWINGS

FIG. 5 is an exploded assembly view of the throttle control system of the directional control assembly;

FIG. 7 is an enlarged partial side view of the directional control shown in a reverse position;

FIG. 8 is an enlarged partial side view of the directional control shown in a forward position and illustrating schematically an alternative braking assembly;

FIG. 12 is a schematic representation of an alternative embodiment interactive braking system which employs a hydraulic circuit in place of the linkage assembly;

FIG. 13 is a schematic representation of an alternative embodiment interactive braking system illustrating the combination of an all mechanical conventional parking brake that works in conjunction with a hydraulic working brake that is connected to the directional control pedal;

FIG. 14 is a schematic representation illustrating yet another alternative embodiment interactive braking system which employs a hydraulic disk brake that is connected to the drive wheel;

FIG. 15 illustrates yet another alternative embodiment interactive braking system which employs a hydraulic drum brake that is connected to the drive wheel.

DETAILED DESCRIPTION OF THE PREFERRED EMBODIMENTS

The present invention is directed to an all electric operating riding greens mower that utilizes an improved braking system. For purposes of providing a detailed description of the preferred embodiments of this invention, the invention is described as follows as an electric triplex greens reel mower having a frame supported on three wheels, three reel type lawn mowers supported from the frame member, an operator station including a seat from which an operator controls the function of the mower, an on-board battery power source of electrical energy and an interactive braking system that is operable to enhance operating control. It should be readily understood that the teachings of the present invention are not limited to the specific type of mower described herein and can be extended to a variety of applications not only in the turf care industry but wherever it is desired to provide enhanced control of a moving device during slow speeds.

Figure 1:
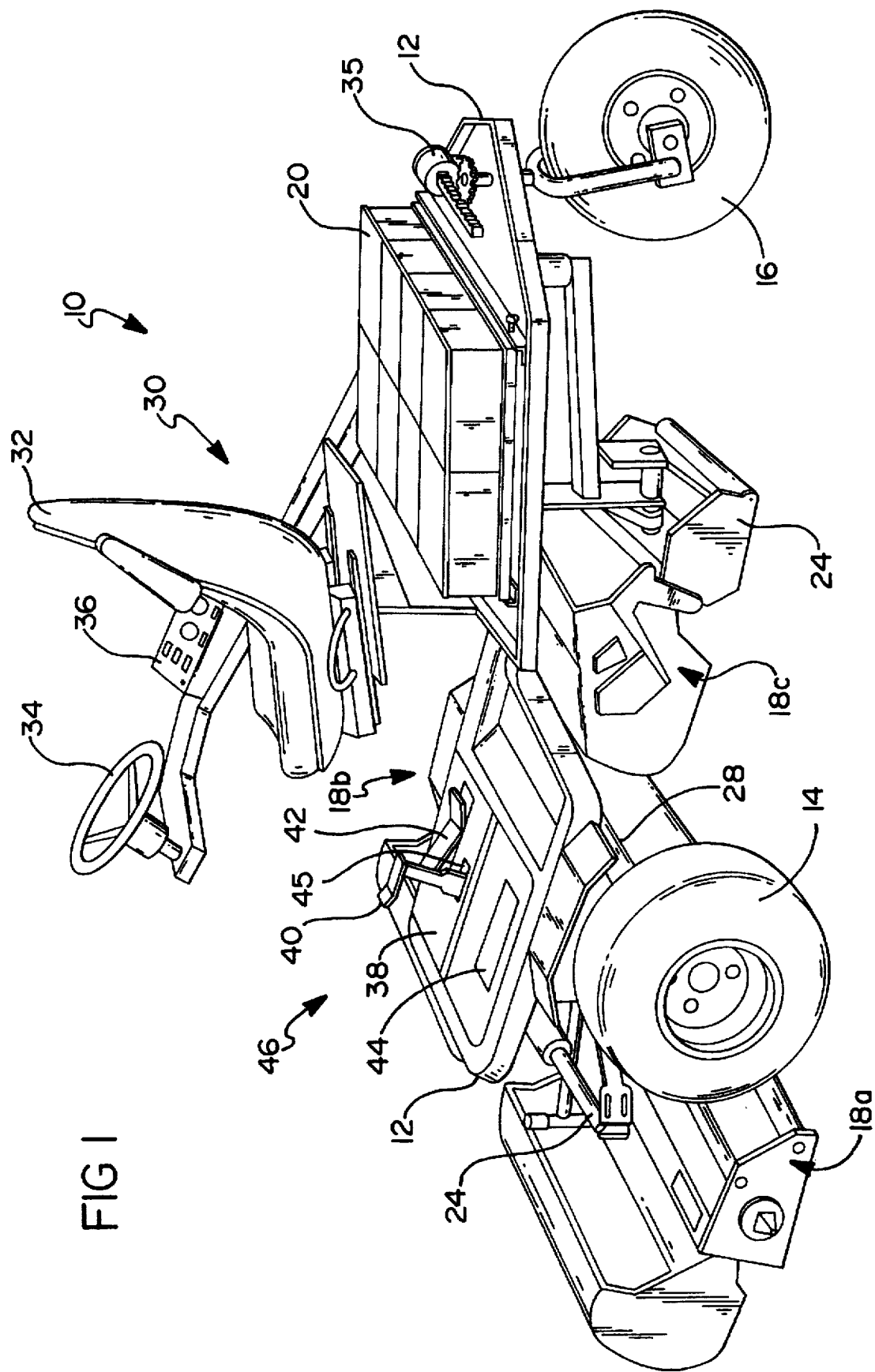
FIG. 1 is a left perspective view of the electric drive riding greens mower of the present invention.
Figure 2:
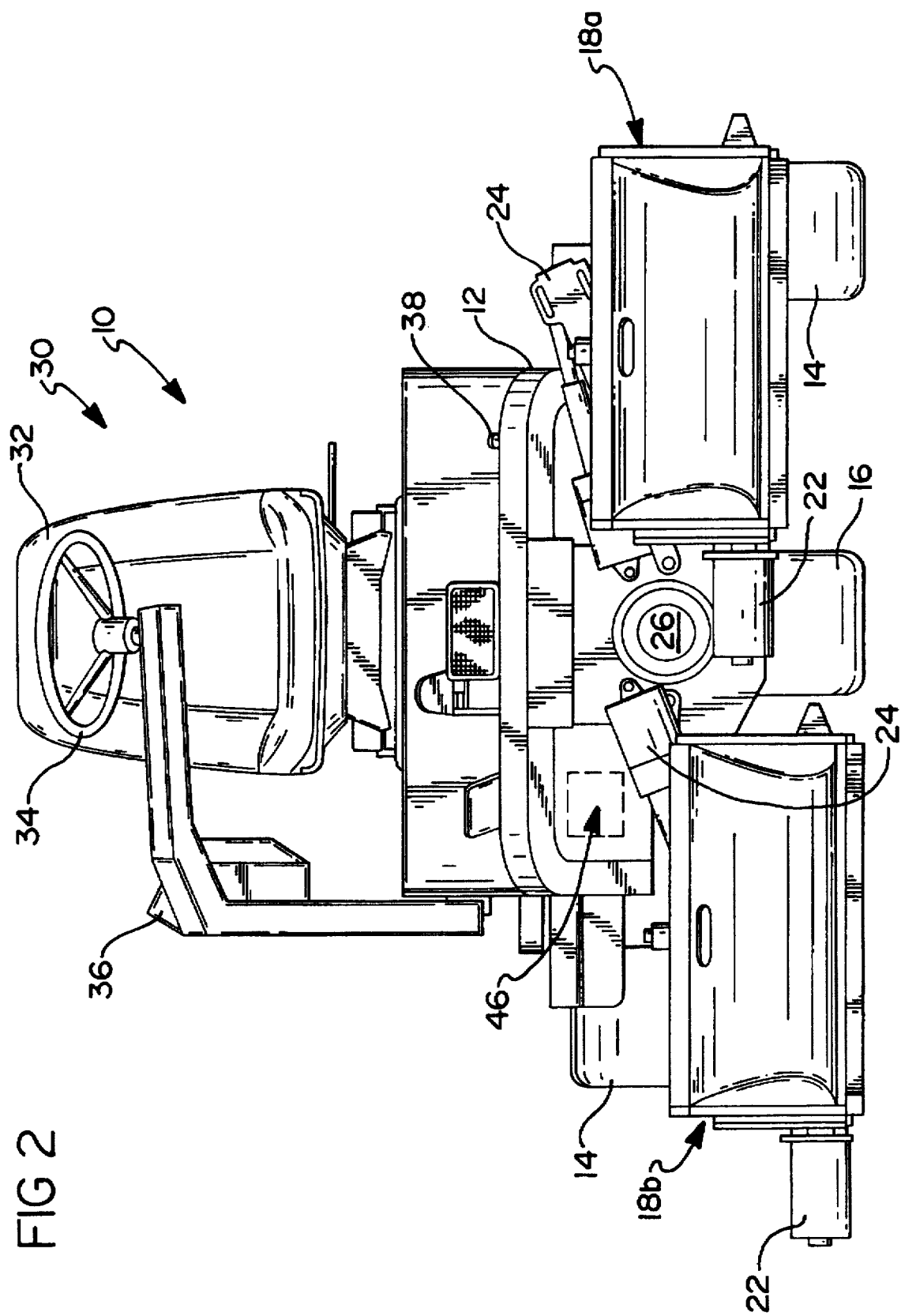
FIG. 2 is a front view of the electric drive riding greens mower of the present invention schematically illustrating the location of the interactive braking system, along with other components of the mower including the reel type mowers and the operator's station.
Figure 3:
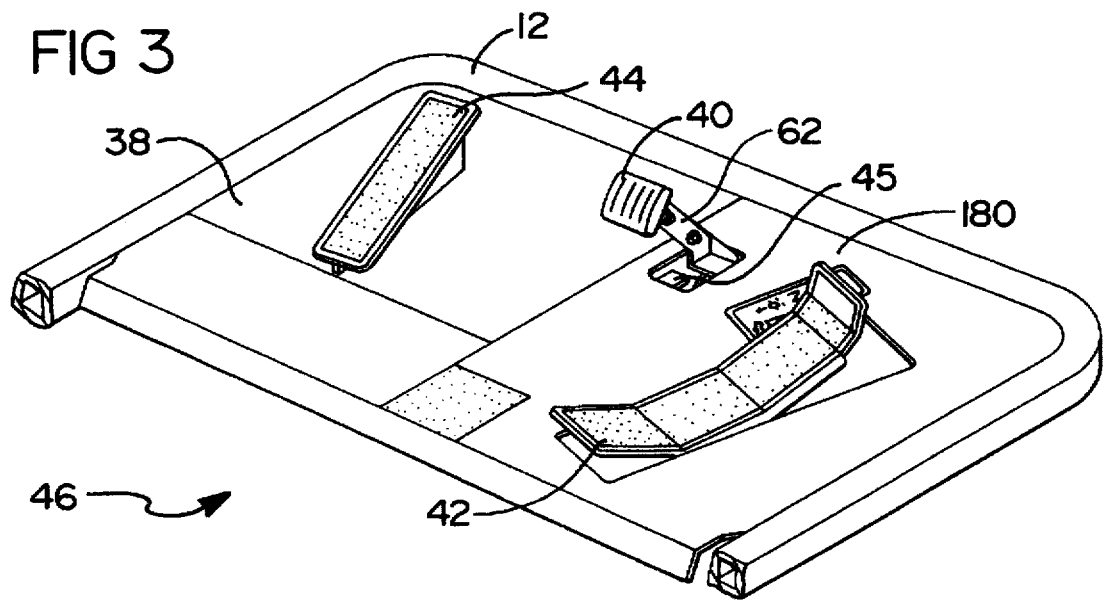
FIG. 3 is a right partial perspective view of the foot deck of the electric mower of the present invention further illustrating the accelerator pedal, the brake pedal, the parking brake switch and the mow on/off switch.

FIGS. 1-3 illustrate the general arrangement of an electric riding greens mower 10. The mower 10 includes a frame 12 supported for movement on a pair of drive wheels 14 and on a rear steerable wheel 16. Two reel type lawn mowers 18a and 18b, are disposed at the forward corners of frame 12 and a third reel lawn mower 18c is centrally disposed below frame 12. A battery power source 20 is made up of a plurality of individual battery packs. Each reel lawn mower 18a–18c is driven by its own electric reel mower motor 22 and each reel mower 18a–18c is capable of being individually raised or lowered by its own reel lift assembly 24. The battery power source 20 also provides electrical energy to a primary mover, an electric motor 26, which is adapted to provide driving torque through a drive axle 28 to each of the drive wheels 14 for propelling the mower 10.

Supported also on the frame 12 is an operator control station 30 which includes primarily a seat assembly 32 a steering wheel 34 and a control panel 36. Steering drive components 35 are connected to the steering wheel 34 and allow the operator to control the steerable wheel 16. A foot deck 38 is also provided and the brake pedal 40, directional control pedal 42, reel mower activation switch (mow switch) 44, and the parking brake switch 45 are ergonomically positioned for operator comfort and ease of operation. It will be appreciated that the previously mentioned components are discussed in greater detail in this Applicant's U.S. Pat. No. 5,406,778 entitled "Electric Drive Riding Greens Mower," which is hereby incorporated by reference.

Figure 4:
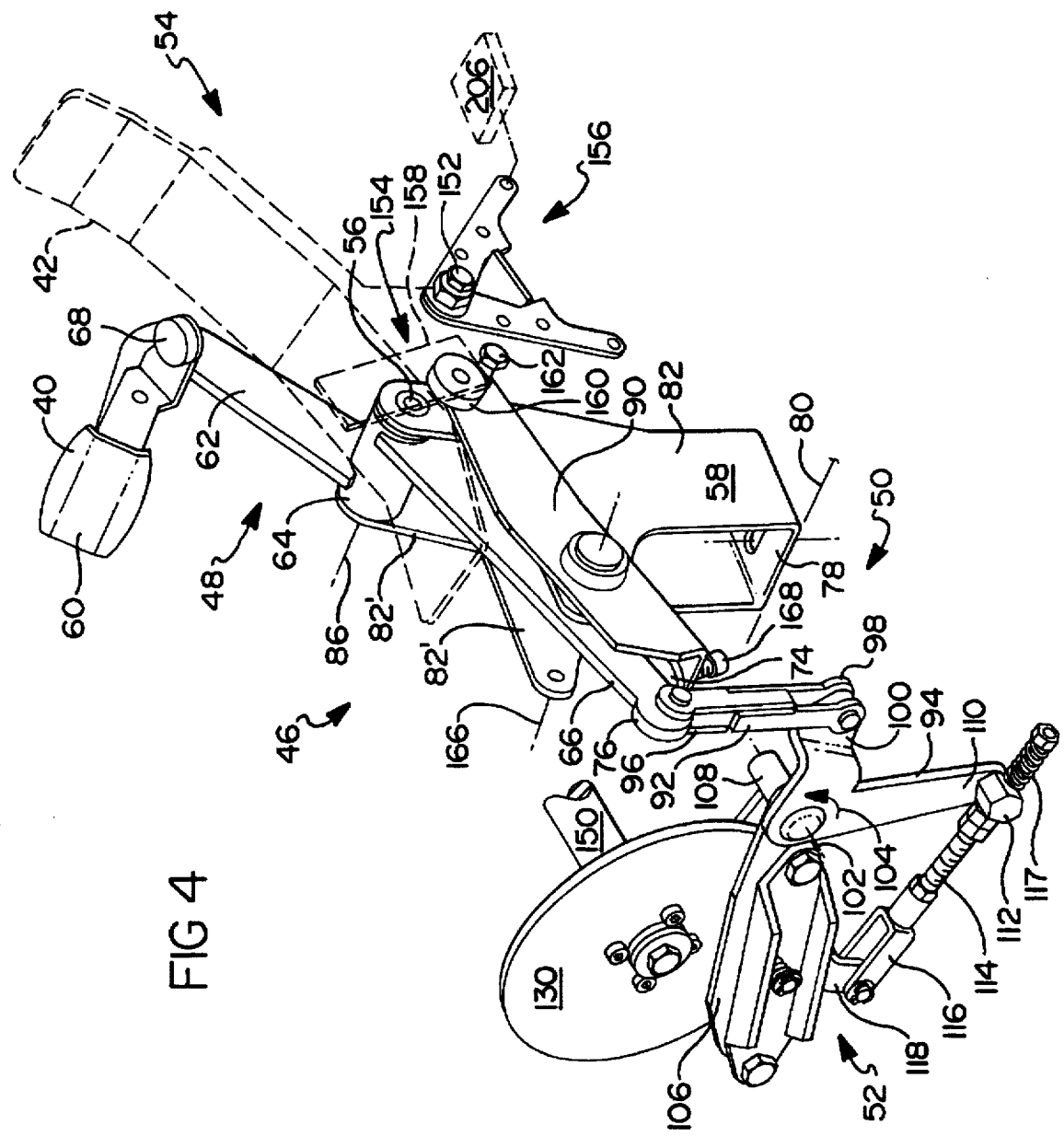
FIG. 4 is an enlarged perspective view of the interactive braking system with the directional control illustrated in phantom and further illustrating the brake pedal assembly, the linkage assembly, the brake caliper assembly and portions of the directional control assembly.

FIGS. 4–10 illustrate the key aspects of the interactive braking system 46. Specifically, FIG. 4 is a perspective view taken from the same angle as FIG. 3, however, the foot deck 38 and some other components have been removed for clarity purposes. The interactive braking system 46 is primarily comprised of a brake pedal assembly 48, a linkage assembly 50, a brake caliper assembly 52 and a direction and speed control assembly 54.

The brake pedal assembly 48 includes the brake pedal 40 which is rotatably connected via a pivot 56 to a brake pedal bracket 58. The brake pedal 40 is comprised of a foot pad 60, an upwardly extending first arm 62 that is fixed to a journal 64 and a second arm 66 that is also fixed to the journal 64. The first arm 62 includes a rubber stop 68 that is operable to engage the underside 72 of the foot deck 38. The second arm 66 has a pad 74 connected thereto and further includes an aperture 76 that receives a connecting pin from a linkage.

The brake pedal bracket 58 is substantially U-shaped and includes a base portion 78 that is preferably secured to a transaxle 80, or some other rigid structure, via conventional fastening devices. The brake pedal bracket 58 further includes a pair of upturned flanges 82 and 82' and flange 82 has an upwardly extending L-shaped mounting flange portion 84 (See FIG. 7) that is secured to the foot deck 38 by conventional methods. The flanges 82 and 82' are substantially parallel and spaced apart from one another for allowing the journal 64 of the brake pedal 40 to be recessed therein and to be pivotally secured to the brake pedal mounting bracket 58 at the pivot point 56. It will be appreciated that conventional connecting means 86 may be used to secure this connection. The brake pedal bracket 58 also has an additional aperture 88 for pivotally connecting the cam follower 90 to the upturned flange 82. It is preferred that the primary components of the brake pedal assembly 48, linkage assembly 50, brake caliper assembly 52 and directional and speed control assembly 54 be made of sufficient rigid materials, for example, steel, in order to withstand operating conditions.

The linkage assembly 50 is comprised of a first linkage member 92 and a second linkage member 94 that are pivotally connected together at a common hinged point. The first link 92 is pivotally connected by conventional means at its upper end 96 to the second arm 66 while the lower end 98 is pivotally connected to a contoured flange 100 of the second link 94. The second link 94 is pivotally connected about an axis 102 to a journal 108 allowing the link 94 to rotate in the direction as indicated by arrow 104. A brake assembly mounting plate 106 includes the conventional journal 108 that allows the pivoting action of the second link 94. The linkage assembly 50 is further comprised of a brake control rod 114 that is connected to the lower end 110 of the second link 94 by a connecting rod 112. The control rod 114 is threaded to allow for adjustment and includes a yoke 116 that is connected to a lower end of a brake actuator arm 118 of the brake assembly 52. The control rod 114 also includes a spring 117 which reacts against the connecting rod 112 thus allowing the brake pedal 40 to overtravel the rod 114 position. The spring 117 is an over-travel spring that allows for some compliance in the linkage assembly 50 so that the parking brake 45 can function properly and further assists in smoothing out the operation of the directional control assembly 54. The spring 117 also smoothes out the forces in the linkage assembly 50 thus providing a smoother operation.

The brake caliper assembly 52 is the presently preferred braking arrangement of the present interactive braking system 46. However, it will be appreciated that other types of brakes may be employed. For example, instead of employing a mechanical linkage system, an adjustable hydraulic braking system or an electric braking system, could be used. Furthermore, disc or drum brakes could be used on the wheels 14 themselves. In this regard, a similar linkage assembly 50 could be employed along with a disc caliper assembly that is connected to the output side of a transmission 80. Such alternative braking assemblies 53 are schematically illustrated in FIG. 8 and are represented in greater detail in alternative embodiment FIGS. 12–16. It will be appreciated that there is a mechanical advantage of locating the brake assembly 52 on the input shaft 150 of the transaxle 80 due to the ratio (approximately 16:1) between the input shaft 150 and the wheels 14. Thus, minimal directional control travel is required in order to impart sufficient pressure on the brake caliper assembly 52 to cause the mower 10 to stop.

Figure 9:
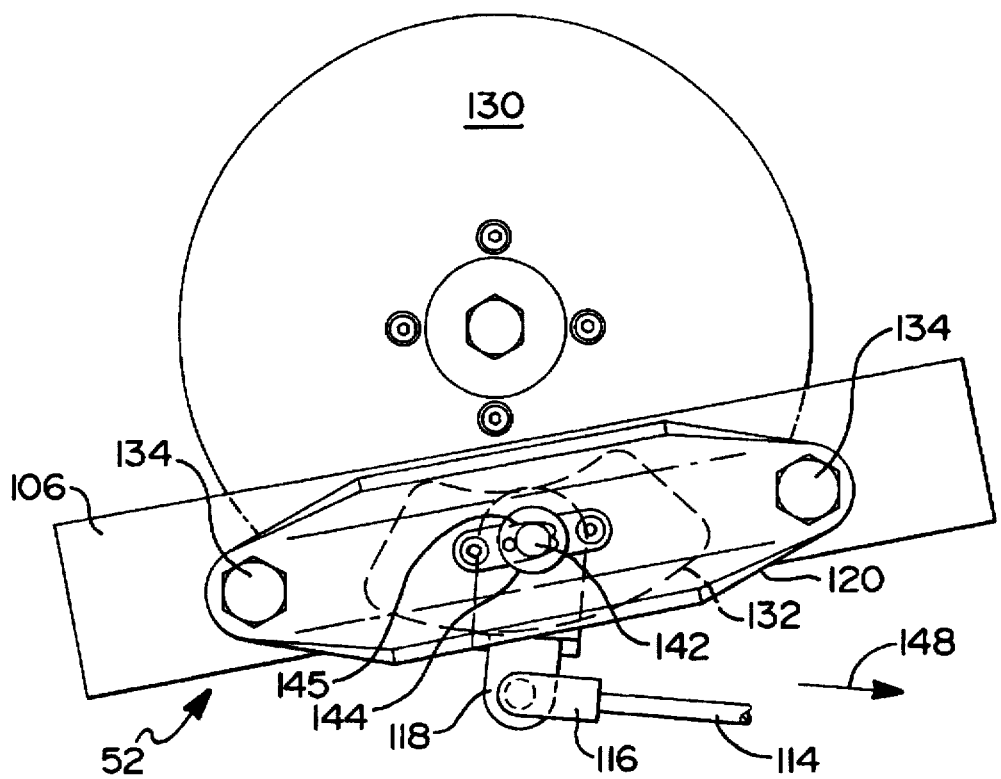
FIG. 9 is an enlarged side view of the brake assembly illustrating the linkage assembly interconnecting therewith.
Figure 10:
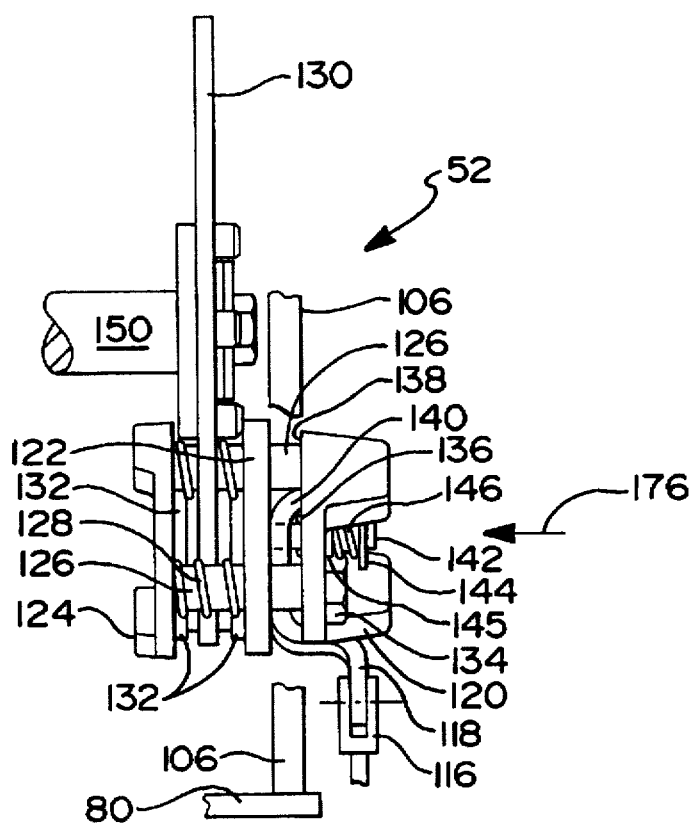
FIG. 10 is an enlarged partial end view of the brake assembly with portions of the mounting bracket broken away and illustrating the disc positioned within the caliper.

According to FIGS. 9 and 10, the primary components of the brake caliper assembly 52 are illustrated which include the brake actuator arm 118, a disc brake housing 120, a sliding inner bracket 122, an outer bracket 124 and a pair of sleeves 126 that interconnect housing 120 and bracket 124 and provide a surface for the inner bracket 122 to slide. A set of springs 128 surround each sleeve 126 and are disposed only between the outer bracket 124 and the inner sliding bracket 122. The springs 128 provide an outwardly biasing force against said brackets and allow the disc 130 to freely rotate without the brake pads 132 interfering when the brake is inactive.

The brake caliper assembly 52 is rigidly secured to the brake assembly mounting plate 106 which is shown partially broken away in FIG. 10 for clarity purposes. The brake caliper assembly 52 is secured in two locations by bolts 134 to the plate 106 and the bolts 134 further extend through the pair of sleeves 126. The plate 106 has two holes (not shown) of sufficient diameter to receive the two sleeves 126. The disc brake housing 120 has an inner cammed surface 136 only on certain portions thereof on the inner face 138 of the housing 120 that engage arcuate-shaped end 140 of the brake actuator arm 118. The arcuate-shaped end 140 has an aperture that is operable to receive a pin 142 that extends through the brake housing 120. A pair of keepers 144 and 145 and a spring 146 is provided on one end of pin 142 to cause a force against the actuator arm 118 when the arm 118 is pulled in the direction of arrow 148 (See FIG. 9). The brake caliper assembly 52 is illustrated in FIG. 10 in the inactive position thus, allowing the disc 130 to freely rotate about input shaft 150 which is preferably connected to the input side of a transaxle 80. It will be appreciated that the disc 130 is connected to the input shaft 150 by conventional methods.

With reference to FIGS. 4–8, the directional control assembly 54 includes an directional control pedal 42 that is pivotally connected about a bolt 152, a cam follower 90 that is rotatably connected to upturned flange 82, a roller assembly 154 and an accelerator control system 156 that monitors the positioning of the directional control pedal 42. Secured to the underside of the directional control pedal 42 is the roller assembly 154 which includes a downwardly extending bracket 158 that has a roller 160 rotatably secured thereto. The roller 160 is operable to intermittently engage a peg 162 that is fixed to one end of the cam follower 90. Thus, as illustrated in FIGS. 4 and 7, when the directional control pedal 42 is in a neutral position 164 the roller 160 is in maximum contact with peg 162 thus causing the cam follower 90 to articulate in a clock-wise direction about axis 166. The cam follower 90 includes a brake lever adjustment screw 168 that butts up against the pad 74 and provides the operator with an adjustment for the interactive braking system 46.

Only a portion of the throttle control system 156 is illustrated in FIG. 4 because of the complexity of the throttle control system 156. The primary components of a throttle control system 156, which is an important aspect of the throttle pedal assembly 54, are clearly illustrated in the exploded view of FIG. 5. The throttle control system 156 is comprised of the throttle pedal 42 which is pivotally supported by bolt 152 that passes through a first control spring arm 170, a second control spring arm 172, a foot pedal pivot bracket 174, a pair of bearings 176, and into a foot pot mounting block 178. The mounting block 178 is, in turn, connected to the underside of a mounting plate 180 which forms a portion of the foot deck 38. Further, the foot pedal pivot bracket 174 is also connected to the underside of the foot pedal plate 180 which in turn is secured to the frame 12 (not shown). A spring 182 biases the directional control pedal 42 to a neutral position and reacts against the two control spring arms 170 and 172. A microswitch 184 is connected to control spring arm 170 and provides a signal indicative of the throttle pedal moving in a direction other than a neutral position. The microswitch 186 is provided with a connector 186 that is connected to a control (not shown) which processes the signals produced by the microswitch 186.

A rod mounting bracket 188 is secured to the control spring arm 170 and supports the left hand ball joint 190. A connecting rod 192 is threaded to the left hand ball joint 190 and provides an extension that engages the right hand quick connect joint 194. Connected to one end of the quick connect joint 194 is a potentiometer actuator arm 196 that mates with a potentiometer 198 that is secured to a potentiometer mounting plate 200. A potentiometer cover plate 202 is provided as well as hardware for securing the potentiometer 198 in place. The potentiometer 198 has an output connector 204 that is electrically connected to a motor controller 206 shown schematically. The foot actuated potentiometer 198 divides the input voltage depending upon the position of the drive pedal 42 and a "tap" voltage is returned via connector 204 to the motor controller 206 which responds by modulating the current flowing to the drive motor 26. Thus, as the operator moves the directional control pedal 42, the connecting rod 192 will move in the direction as indicated by arrow 208, which in turn causes the potentiometer actuator arm 196 to rotate in a clockwise direction. The relative angle of change of rotation by the potentiometer actuator arm 196 is sensed by the potentiometer 198 to cause a signal indicative of the angle of inclination of the directional control pedal 42.

The throttle control system 156 further includes tread inserts 210 that are adhered to the pedal 42 for operator convenience. For further details as to how the electronic directional control pedal 42 operates, see Applicant's U.S. Pat. No. 5,406,778 which is hereby incorporated by reference.

Having fully described the primary components of the present invention, the method of operating the interactive braking system 46 will now be presented.

The interactive braking system 46 is easily implemented by an operator and is primarily intended for enhancing the operator's control of the mower 10 during low speed operations. That is, at speeds approximately 3.0 miles per hour or less which are speeds generally slower than green cutting speeds. To activate the proportional interactive braking system the operator only needs to place his foot on the directional control pedal 42. This is one of the unique features of this braking system 46 in that it does not require the operator to engage the brake pedal 40 in order to slow down the mower 10. By returning the directional control pedal 42 to a near neutral position 164 (see FIGS. 6 and 11), the operator begins to activate the brake assembly 52.

Maximum breaking force of the interactive braking system 46 is obtained when the directional control pedal 42 is directly at the neutral position 164. This occurs when the roller 160 is in maximum contact with the pin 162 which causes cam follower 90 to articulate around axis 166 in a clockwise direction as illustrated. This causes the brake lever adjusting screw 168 to engage pad 74 which, in turn causes the brake lever arm 66 to rise in the direction of arrow 174. This action causes linkage assembly 50 to rotate in the direction of arrow 104 (see FIG. 4) which results in the brake actuator arm 118 to be pulled in the direction of arrow 148 (see FIG. 9). The forward motion exerted upon brake actuator arm 118 causes the arcuate end 140 of actuator arm 118 to ride upon the cammed surface 136 which, in turn, causes pin 142 to traverse in the direction of arrow 176 (see FIG. 10). This causes pin 142 to force the inner bracket 122 also in the direction of arrow 176 thus applying an equally distributed clamping force on disc 130 by both brake pads 132. To minimize the braking force, the directional control pedal 42 is moved from the neutral position 164 which in turn, causes the arcuate end 140 of the actuator arm 118 to ramp down from the cammed surface 136 thus reducing the compression of spring 146 and the resulting force exerted by pin 142 in the direction of arrow 176. If the operator automatically releases directional control pedal 42, the brake actuator arm 118 naturally returns to a position such that the arcuate end 140 does not engage the cammed surfaces 136 anymore. This allows the springs 128 to push apart the brake pads 132 such that the disc 130 is no longer engaged. It is important to note that the brake actuator arm 118 can be pulled in a direction of arrow 148 (See FIG. 9) or pushed in the opposite direction thereof, either of which will result in a braking force being applied to the disc 130. Also, the operator may depress the brake pedal 40 and override the throttle pedal assembly 54 because of the unique arrangement of the cam follower 90, peg 162 and the roller 160.

Figure 11:
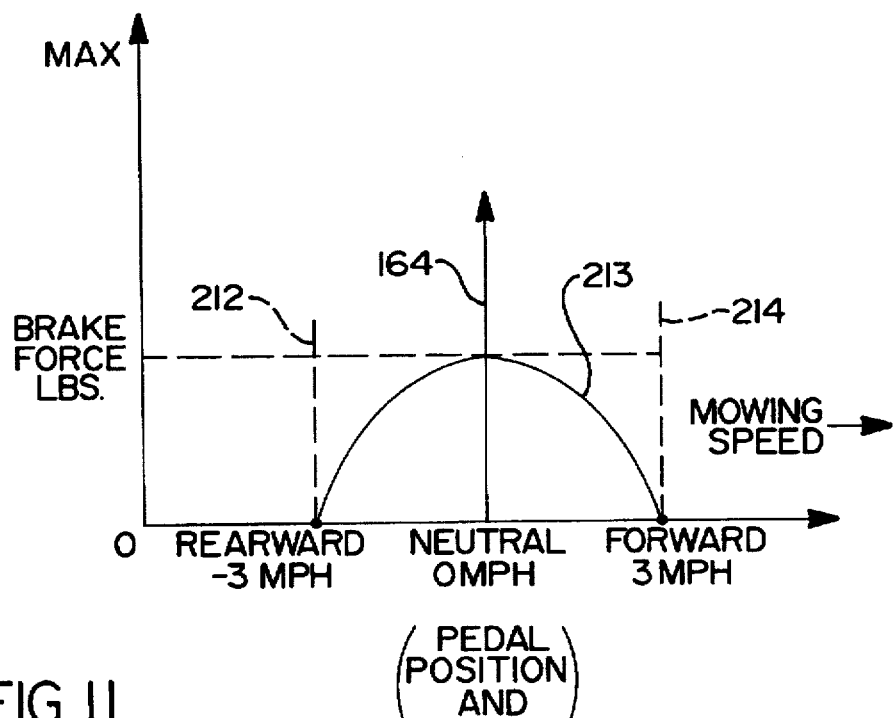
FIG. 11 is a graph illustrating the relationship between braking force and the position of the directional control pedal.

FIGS. 7 and 11 represent the positioning of the directional control pedal 42 in a reverse position 212 wherein the roller 160 is forward of the pin 162. At this position, very little, if any, braking action is being provided by the directional control assembly 54 because the cam follower 90 is barely, if at all, articulating. Thus, for the operator to begin to activate the interactive braking system 46, the operator merely needs to move directional control pedal 42 between the positions 164 and 212 which will begin to provide a braking force proportional to the degree of rotation of the directional control pedal 42. The brake force curve 213 represents the proportional braking force which reaches a maximum value near top dead center or neutral 164.

FIGS. 8 and 11 illustrate the forward position 214 of the directional control pedal 42 wherein little or no braking force is being generated by the interactive braking system 46. Here the roller 160 is shown slightly behind the peg 162 thus allowing the articulating arm 90 to barely, if at all, articulate. This position might be indicative of a mower speed of approximately greater than four miles per hour. In the event the operator is confronted with a condition where it is desirable to maintain control at low operating speeds, then the operator would merely return pedal 42 towards the neutral position 164. When the angular position of the directional control pedal 42 is anywhere between positions 164 and 214, a proportional braking force will be exerted upon the drive wheels 14 via the linkage assembly 50 and brake caliper assembly 52 as previously discussed. Thus, the operator does not have to remove his foot from the directional control pedal 42 in order to generate a braking force upon the drive wheels 14.

As indicated in the discussion for FIG. 8, alternative embodiment braking assemblies 53 can be used in the interactive braking system 46. More specifically, an alternative embodiment interactive braking system 220 uses a hydraulic circuit 222 that interconnects the brake pedal 40 and direction control pedal 42 to the brake lever arm 118. The hydraulic circuit 222 includes a master cylinder 224 that is connected via hydraulic line 226 to a slave cylinder 228. The slave cylinder 228 is fixed to the transaxle 80 or to the frame 12 of the mower. The slave cylinder 228 is spring biased and has a piston 230 that is pivotally connected to brake actuator arm 118. At the other end of the hydraulic circuit 222, the master cylinder 224 is connected to first linkage 92 via conventional methods. The brake pedal assembly 48 and the direction and speed control assembly 54 are the same as described above and are interconnected to the first link 92 in the same manner as previously described. Furthermore, the brake caliper assembly 52 as previously described is used and is connected to either the frame 12 or the transaxle 80. The transaxle 80 is connected to drive axles 28 which are in turn connected to the drive wheels 14.

Figure 6:
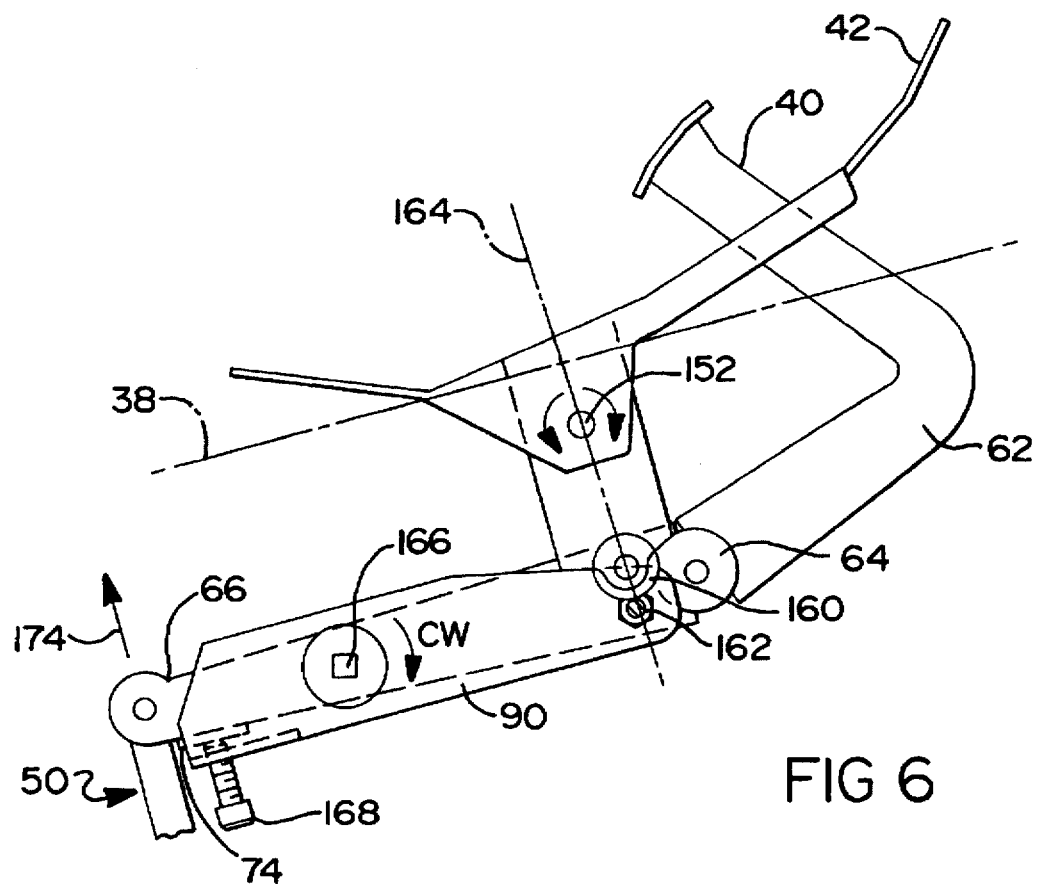
FIG. 6 is an enlarged partial side view of the directional control assembly shown in a neutral position which is the maximum braking force generated by the directional control with the throttle control system components removed.

In order to operate the hydraulic indirective braking system 220, the operator depresses directional control pedal 42 in the same manner as previously described thus causing cam follower 90 to articulate. This dynamic motion causes first linkage member 90 to move downward thus acting against the spring biased piston of the master cylinder 224. This increases fluid pressure in hydraulic line 226 which causes the slave cylinder 228 to react proportionally by moving brake lever arm 118. To obtain the maximum braking force, the directional control pedal 42 needs to be advanced to the neutral position 164 as indicated in FIGS. 6 and 11. Conversely, to reduce the braking force that is produced by the directional control pedal 42, the operator merely needs to advance the directional control pedal 42 towards either a forward position 214 or a rearward position 214 (see FIGS. 7, 8 and 11).

Another alternative embodiment interactive braking system 240 is illustrated in FIG. 13. Here a combination braking system 240 is comprised of a conventional foot brake assembly 48 that is connected to a linkage assembly 50 which in turn is connected to a brake caliper assembly 52 on the input side of a transaxle 80. The key difference with this alternative embodiment is the employment of a hydraulic working brake system 242 that operates off of the directional and speed control pedal 42. The hydraulic braking system 242 is comprised of a directional control pedal 42 that is connected by a member 244 to a spring biased master cylinder 224. The master cylinder 224 is connected to a flexible hydraulic line 226 which delivers pressurized fluid to slave cylinder 228. It will be appreciated that the slave cylinder 228 may be located in various positions on the mower 10. For example, referring to FIGS. 13 and 14, the slave cylinder 228 is connected to a disk brake assembly 246. The disk brake assembly 246 has a conventional caliper 248 and a disk 250 that are mounted to directly control the wheel 14.

Yet another alternative arrangement of the FIG. 13 embodiment would be to provide an interactive braking system 260 that connects the hydraulic braking system 242 to a drum brake 262 as schematically illustrated in FIG. 15. Here the hydraulic line 226 delivers pressurized hydraulic fluid to the brake calipers 264 which react against a drum 266. This alternative braking system 260 would also use the brake pedal assembly 48, the linkage assembly 50 and the transaxle brake caliper assembly 52 as previously described in FIG. 13. However, it is contemplated that this invention cover a variety of interactive braking systems that employ various brake pedal and directional control pedal arrangements. These arrangements can react either on the input shaft of the transaxle or even directly on the wheel 14.

Figure 16:
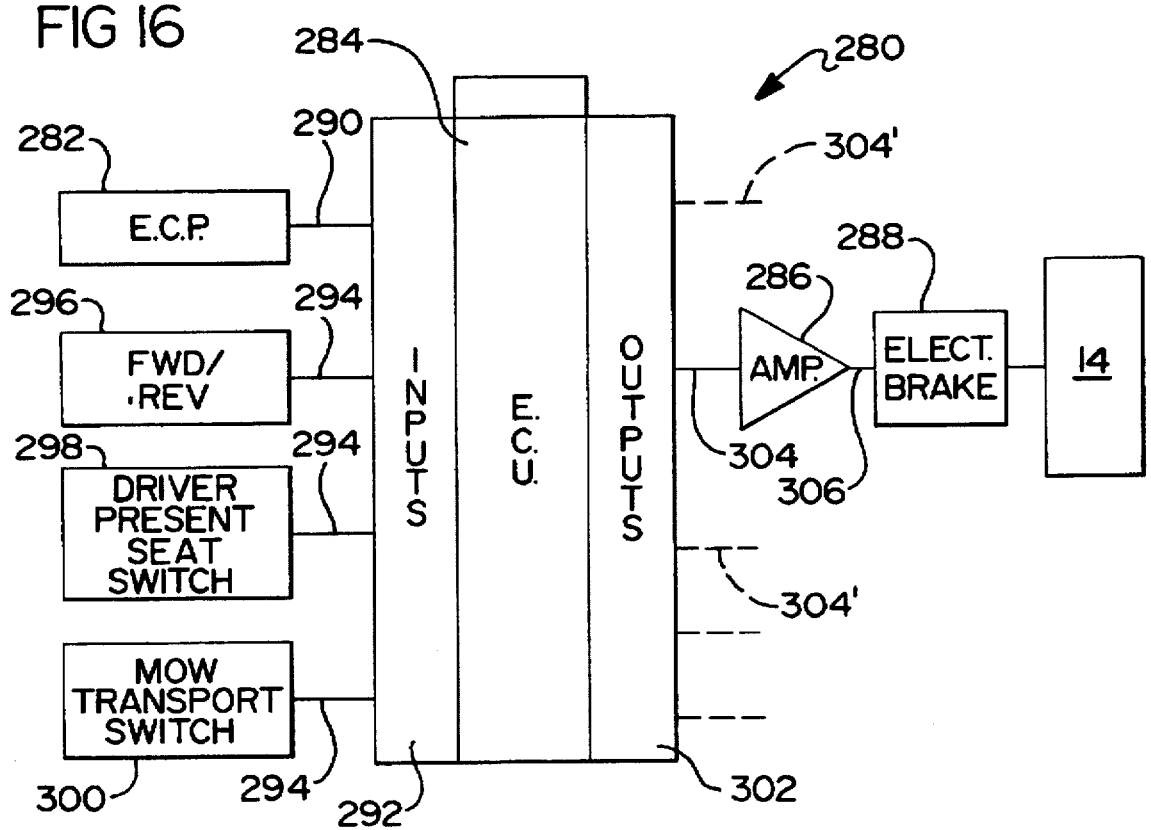
FIG. 16 schematically illustrates another alternative embodiment interactive braking system that employs an electric brake.

And finally, FIG. 16 illustrates another alternative system where an electric interactive braking system 280 is comprised of a directional speed control pedal pot 282, an electronic control unit (ECU) 284, an amplifier 286 and a proportional electric brake 288. The brake 280 could use conventional solenoid operated brakes. The pot 282 is set up similar to the directional control system 156 as illustrated in FIG. 5 wherein an output signal 290 proportional to the relative angle of the directional control pedal 42 is produced. The output signal 290 is received on the input side 292 of the electronic control unit 284 wherein the signal is processed. It will be appreciated that other input signals 294 may be delivered to the electronic control unit 284. For example, signals 294 could be produced from a forward reverse pedal indicator 296, a driver present seat switch 298 and a mower transport switch 300, just to name a few. The electronic control unit has an output side 302. After the ECU processes the input signals, one or more output signals 304 and 304' are produced. Output signal 304 (analog or digital) is sent to an amplifier 286. The amplifier 286 produces a signal 306 that is indicative of the relative angle of the directional control pedal 42. The signal 306 causes the proportional electric brake 288 to react in a manner proportional to the degree of braking force desired on wheel 14 as indicated in FIG. 11. It will be appreciated that the ECU 284 could have its own amplifier thus negating the need for external amplifier 286. The electric brake 288 may be connected to the input shaft 150 of the transaxle 80, on the output side of the transaxle 80, or even to the drive wheels 14. It will be appreciated that the ECU 302 could be hard wired or made of other acceptable hardware.

While specific embodiments have been shown and described in detail to illustrate the principles of the interactive braking system for a riding greens mower, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as described in the following claims.

What is claimed:

1. A control system for a self-propelled riding mower comprising:

a brake mechanism that is operable to control the speed of the riding mower; and an accelerator mechanism including a means for accelerating the riding mower and the accelerator mechanism further including a means for controlling the speed of the riding mower once the speed of the mower falls below a predetermined threshold.

2. The control system for a self-propelled riding mower as claimed in claim 1 wherein the means for controlling the speed is operable to engage the brake mechanism and cause the riding mower to slow down.

3. A method for controlling a riding mower comprising the steps of:

providing a brake pedal, an accelerator assembly, a linkage assembly and a brake assembly;

depressing the accelerator assembly to cause the riding mower to be propelled in a first direction;

releasing the accelerator assembly;

automatically engaging the brake assembly in a proportional manner without engaging the brake pedal.

4. The method for controlling a riding mower as claimed in claim 3 further comprising the steps of depressing the accelerator assembly and increasing the speed of the riding mower so that it is propelled in a second direction, reducing the speed of the riding mower to approximately 3 miles per hour, and proportionally activating the brake assembly without depressing the brake pedal.

5. A method for controlling a riding mower comprising the steps of:

provided a brake pedal, an accelerator assembly and a means for braking the riding mower;

providing an electronic control unit, the electronic control unit receiving an electronic accelerator control signal from the accelerator assembly, the electronic accelerator control signal varying in accordance with a position of the accelerator assembly;

depressing the accelerator assembly to cause the riding mower to be propelled in a first direction, the electronic control unit receiving the electronic accelerator control signal and generating a control command in accordance with the electronic accelerator control signal;

releasing the accelerator assembly thereby varying the electronic accelerator control signal, the electronic control unit detecting a variation in the electronic accelerator control signal and generating an output signal; and automatically engaging the means for braking the riding mower in response to the accelerator control signal in a proportional manner without engaging the brake pedal.

6. The method for controlling a riding mower as claimed in claim 5 further comprising the steps of:

depressing the accelerator assembly so that it is propelled in a second direction;

reducing the speed of the riding mower to approximately 3 miles per hour; and proportionally activating the means for braking the riding mower without depressing the brake pedal.

7. A self-propelled riding mower comprising:

a frame supported upon a plurality of ground engaging wheels;

a battery power source;

a plurality of reel type lawn mowers supported from the frame, the reel type lawn mowers being moveable between a raised non-operative position and a lowered operative position in which the reel type lawn mowers engage the ground, the reel mowers being driven by electric motors receiving electrical power from the battery power source;

a prime mover comprising an electric motor supplied with electrical energy from the battery power source and adapted to provide driving torque to at least one of the ground engaging wheels;

an accelerator assembly which generates an electronic control signal which varies in accordance with the position of the accelerator assembly;

a brake pedal connected to the frame;

a means for braking the riding mower; and an electronic control unit, the electronic control unit receiving the electronic accelerator control signal, the electronic control unit generating an output signal to control the speed of the mower in accordance with the electronic control signal, wherein varying the position of the accelerator assembly varies the output signal, and the electronic control unit automatically actuates the means for braking the riding mower under predetermined conditions in response to the accelerator control signal without engaging the brake pedal.

* * * * *